United States Patent
Chao et al.

(10) Patent No.: US 8,037,130 B2
(45) Date of Patent: Oct. 11, 2011

(54) UBIQUITOUS PROXY MOBILE SERVICE METHOD AND SYSTEM AND COMPUTER RECORDABLE STORAGE MEDIUM FOR THE METHOD

(75) Inventors: Chih-Wei Chao, Taichung County (TW); Jen-Yau Kuo, Hsinchu (TW); Li-Dien Fu, Kinmen County (TW); Kuo Shu Luo, Hsinchu (TW); Tung-Hung Lu, Yilan County (TW); Min-Hsien Weng, Taichung County (TW); Tsu-Kuang Yang, Taichung County (TW)

(73) Assignee: Industrial Technology Research Institute, Hsinchu (TW)

( * ) Notice: Subject to any disclaimer, the term of this patent is extended or adjusted under 35 U.S.C. 154(b) by 209 days.

(21) Appl. No.: 12/477,886

(22) Filed: Jun. 3, 2009

(65) Prior Publication Data

US 2010/0167703 A1    Jul. 1, 2010

(30) Foreign Application Priority Data

Dec. 29, 2008    (TW) ............................... 97151199 A (51) Int. Cl.
  *G06F 15/16*    (2006.01)
  *H04W 24/00*    (2009.01)
(52) U.S. Cl. ...................... 709/203; 455/456.1; 709/217
(58) Field of Classification Search .................. None
  See application file for complete search history.

(56) References Cited

U.S. PATENT DOCUMENTS

| | | | |
|---|---|---|---|
| 6,796,496 B2 | 9/2004 | Andersen et al. | |
| 7,606,869 B2 * | 10/2009 | Sieben et al. | 709/216 |
| 7,646,296 B2 * | 1/2010 | Ohki | 340/539.13 |
| 7,712,657 B1 * | 5/2010 | Block et al. | 235/379 |
| 2004/0110515 A1 * | 6/2004 | Blumberg et al. | 455/456.1 |
| 2005/0136886 A1 * | 6/2005 | Aarnio et al. | 455/404.2 |
| 2008/0177994 A1 * | 7/2008 | Mayer | 713/2 |
| 2008/0248815 A1 * | 10/2008 | Busch | 455/456.5 |
| 2009/0012704 A1 * | 1/2009 | Franco et al. | 701/200 |
| 2009/0061901 A1 * | 3/2009 | Arrasvuori et al. | 455/456.3 |
| 2009/0275287 A1 * | 11/2009 | Renkis | 455/63.1 |

FOREIGN PATENT DOCUMENTS

| | | |
|---|---|---|
| TW | I265680 | 11/2006 |
| TW | I279710 | 4/2007 |

* cited by examiner

*Primary Examiner* — Wen-Tai Lin (57) ABSTRACT

A ubiquitous proxy mobile service method and system is disclosed. When a mobile device is near a dissemination medium, group data and individual data transmitted by at least one ubiquitous proxy transmission interface of the dissemination medium are read by a ubiquitous proxy receiving interface of the mobile device. A screen of the mobile device displays an interaction icon corresponding to the ubiquitous proxy according to the group data and the individual data. Uniform resource locator data in the individual data of the ubiquitous proxy corresponding to the interaction icon is read when the interaction icon is activated. A redirect operation is performed according to the uniform resource locator data to obtain a corresponding network service.

29 Claims, 5 Drawing Sheets

UBIQUITOUS PROXY MOBILE SERVICE METHOD AND SYSTEM AND COMPUTER RECORDABLE STORAGE MEDIUM FOR THE METHOD

CROSS REFERENCE TO RELATED APPLICATIONS

This Application claims priority of Taiwan Patent Application No. 97151199, filed on 29 Dec. 2008, the entirety of which is incorporated by reference herein.

BACKGROUND OF THE INVENTION

1. Field of the Invention

The invention relates to a ubiquitous proxy mobile service method and system.

2. Description of the Related Art

Currently, information is easily retrieved from various sources through a variety of means. Mobile technology is currently a popular means to receive information, using wireless technology such as wireless networks, Bluetooth, and global positioning systems (GPS) to provide mobile services. The mobile services frequently utilize near communication technology such as Bluetooth, radio frequency identification (RFID), ultra-wide band (UWB), and near field communication (NFC).

RFID which also called electronic tags is a wireless communication technology that recognizes a specific target and reads and writes relative data via radio signals without recognizing mechanical or optical contact between an identification system and the specific target. RFID has been widely applied for E-life digital technology, such as product resumes and anti-counterfeit credit cards, PayPal accounts, consigning shipments at the airport, and transportation. An RFID system comprises information stored in a tag which is read using a reader via the RFID, wherein the information is transformed to meaningful information using a decompiling process.

Mobile service applications normally focus on object recognition and near communication technology, however, providing a service portal based on near communication technology such as RFID which achieves "unconfined information services" according to ubiquitous proxy services is useful.

BRIEF SUMMARY OF THE INVENTION

Ubiquitous proxy mobile service methods are provided. An exemplary embodiment of a ubiquitous proxy mobile service method comprises the following. When a mobile device is near a dissemination medium, group data and individual data transmitted by at least one ubiquitous proxy transmission interface of the dissemination medium are read by a ubiquitous proxy receiving interface of the mobile device. A screen of the mobile device displays an interaction icon corresponding to the ubiquitous proxy according to the group data and the individual data. Uniform resource locator data in the individual data of the ubiquitous proxy corresponding to the interaction icon is read when the interaction icon is activated. A redirect operation is performed according to the uniform resource locator data to obtain a corresponding network service.

Ubiquitous proxy mobile service systems are provided. An exemplary embodiment of a ubiquitous proxy mobile service system comprises a dissemination medium and a mobile device. The dissemination medium comprises at least one ubiquitous proxy transmission interface. The mobile device further comprises a screen, at least one ubiquitous proxy transmission interface, a process unit, a vision mapping and generating engine, and a uniform resource locator (URL) address transformation module. The process unit reads group data and individual data of a ubiquitous proxy service transmitted by the ubiquitous proxy transmission interface through the ubiquitous proxy receiving interface when the mobile device is near the dissemination medium. The vision mapping and generating engine displays an interaction icon corresponding to the ubiquitous proxy service on a screen of the mobile device according to the group data and the individual data. The URL address transformation module reads URL data in the individual data of the ubiquitous proxy service corresponding to the interaction icon when the interaction icon is activated, performs a redirecting operation according to the uniform resource locator data, and obtains a corresponding network service according to the redirecting operation.

A computer-readable medium encoded with computer executable instructions for performing a ubiquitous proxy mobile service method is further provided. The computer executable instructions comprises, when a mobile device is near a dissemination medium, reading group data and individual data of a ubiquitous proxy service transmitted by at least one ubiquitous proxy transmission interface of a dissemination medium from a ubiquitous proxy receiving interface of the mobile device, displaying an interaction icon corresponding to the ubiquitous proxy service on a screen of the mobile device according to the group data and the individual data, reading URL data in the individual data of the ubiquitous proxy service corresponding to the interaction icon when the interaction icon is activated, performing a redirecting operation according to the uniform resource locator data, and transformation a corresponding network service according to the redirecting operation.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Several exemplary embodiments are described with reference to FIGS. 1 through 5, which generally relate to ubiquitous proxy mobile services. It is to be understood that the following disclosure provides various different embodiments as examples for implementing different features. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

A ubiquitous proxy mobile service method and system is disclosed.

An embodiment of the ubiquitous proxy mobile service method and system transfers a user interface of a physical medium to a digital medium, which uses a creative mobile business method to enable the consumer to obtain near real-time mobile services via ubiquitous proxy and vision mapping technology while substantially reducing the amount of transmission of network packets.

The "ubiquitous proxy service" indicates information relay points which can be substantially disposed around an environment and computer readable information is stored in the information relay points and is freely provided for users via near communication devices and methods thereof. The near communication devices herein comprise Bluetooth, radio frequency identification (RFID), ultra-wide band (UWB), near field communication (NFC), or others. The "ubiquitous proxy service" herein indicates near communication technology or other technology achieving similar effects.

The "vision mapping" indicates contents recorded in a physical dissemination medium is visualized and mapped to a digital medium, such as a portable computer, a cell phone, a personal digital assistant (PDA).

A new mobile service that obtains network services based on Rich User Interface Mark-up Language (RUIML) is disclosed. Thus, the consumer may retrieve a real service later from requesting network packets of the service. Thus, time delay and packet consumption required for performing pre-processing operations, such as logging onto a portal site and searching by key words, under a general network service mode can be prevented. Further, the ubiquitous proxy services can be substantially disposed on any dissemination media so various network bookmarks allocated in the environment can be used by users.

Figure 1:
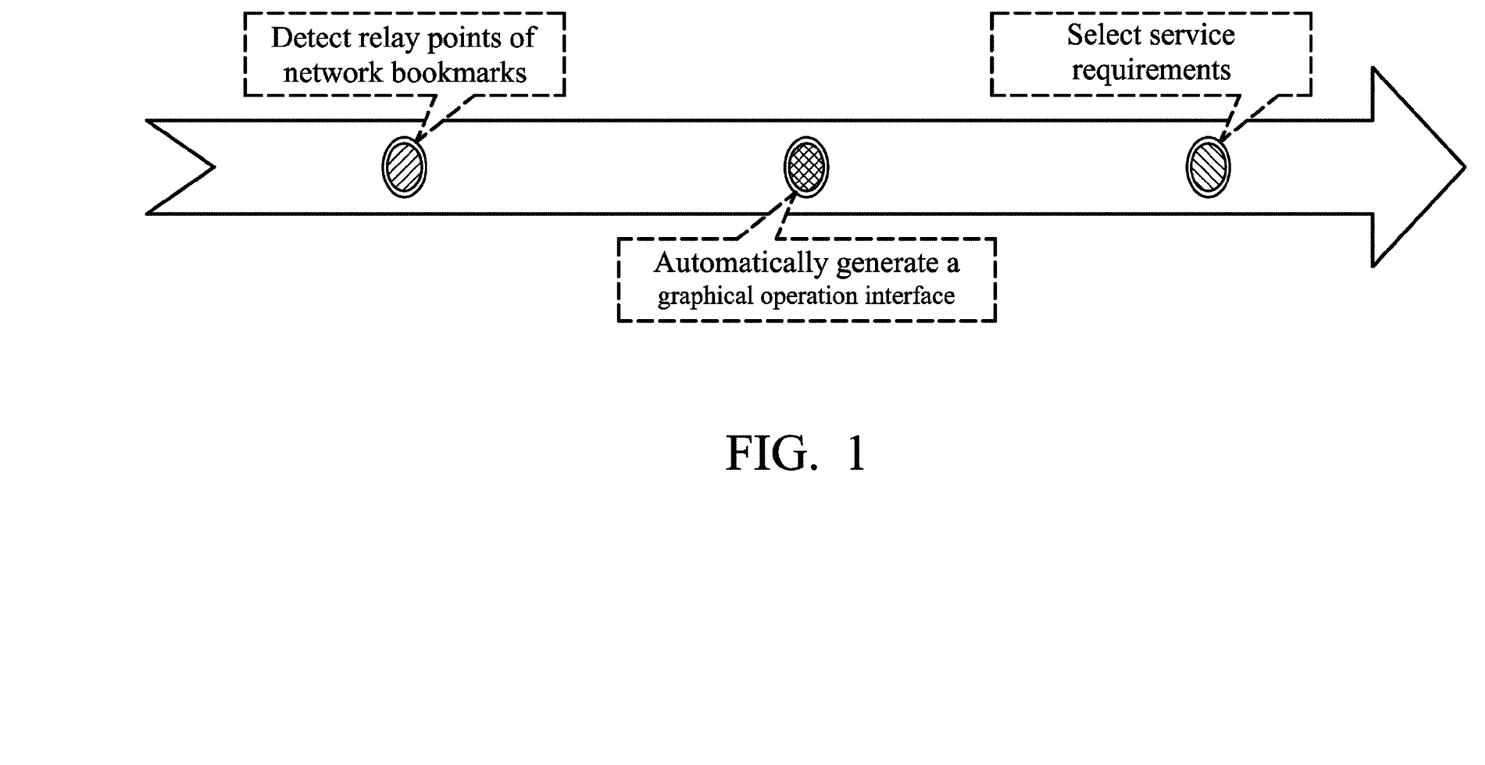
FIG. 1 is a schematic view of transformation mobile services based on RUIML consistent with some embodiments.

FIG. 1 is a schematic view of transformation mobile services based on RUIML consistent with some embodiments.

Relay points of network bookmarks can be created using mobile services selected by a user. It is assumed that the user cannot set a mobile service which is first retrieved as a network bookmark. Additionally, mobile services may be required at time points when a user walks on the street, rides the public transportation system, or travels. Network bookmarks can be automatically retrieved at those time points and relay points of network bookmarks are obtained via a dissemination medium. For example, when a URL address of a target on a poster is detected, a service of the target is directly connected, representing a simple application of materializing the network bookmark relay. Requirements of near real time and ubiquitous proxy for mobile services can be implemented using the described methods.

Simple graphical interfaces of large icons are mainly developed by mobile device vendors. However, as the graphical interfaces are dynamically generated based on different dissemination media, system parameter must be set at the runtime. The graphical interfaces must also be combined with the physical dissemination media. Thus, automatic generation of graphical interfaces is required.

Inconvenience for linking multiple web pages layer by layer must be overcome when the automatic generation of service menus is performed under a mobile Internet environment. Service menus are automatically generated based on service targets which may be required for the consumer and the graphical interfaces are visually mapped with physical network bookmarks.

Figure 2:
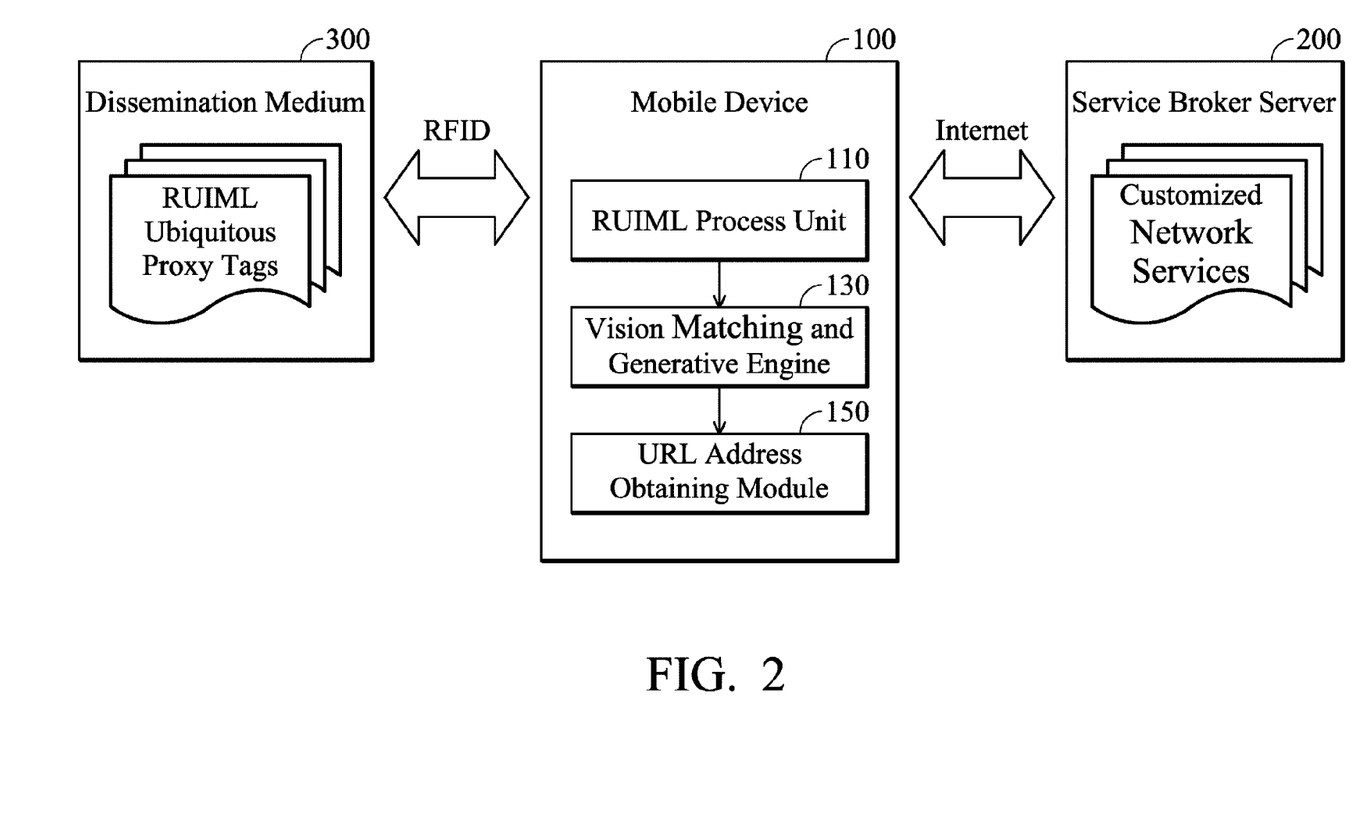
FIG. 2 is a schematic view of a ubiquitous proxy mobile service system consistent with some embodiments.

FIG. 2 is a schematic view of a ubiquitous proxy mobile service system consistent with some embodiments.

An embodiment of the ubiquitous proxy mobile service system can be implemented using RFID, Bluetooth, quick response (QR) codes, or near field communication (NFC) technologies.

An embodiment of the ubiquitous proxy mobile service system comprises a mobile device 100, a service broker server 200, and a dissemination medium 300. The service broker server 200 processes back-end web services. The mobile device 100 comprises a RUIML process unit 110, a vision mapping and generating engine 130, and a URL address transformation module 150, which are respectively described as follows.

RUIML Process Unit 110

Figure 3:
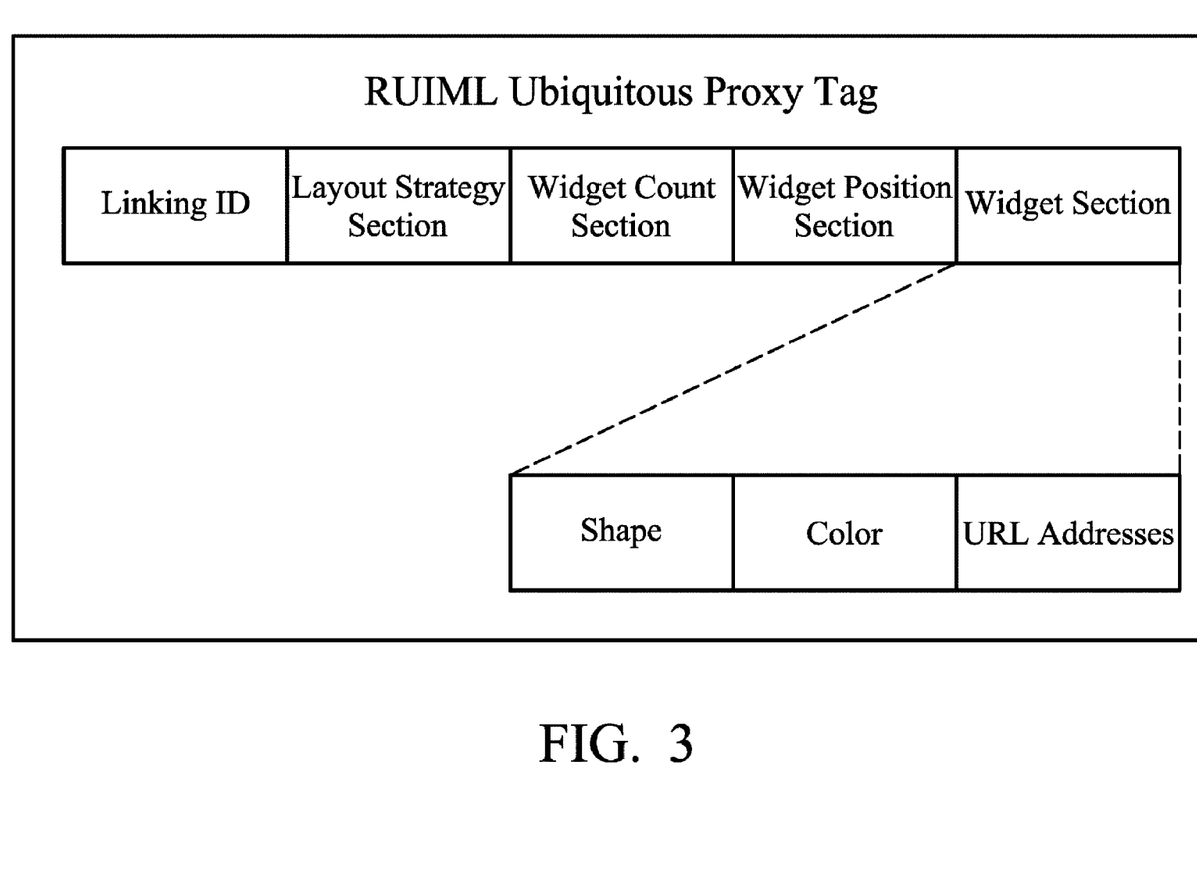
FIG. 3 is a schematic view of RUIML ubiquitous proxy data consistent with some embodiments.

The RUIML process unit 110 reads data (RUIML ubiquitous proxy data in this embodiment) read by a ubiquitous proxy receiving interface (an RFID reader in this embodiment) (not shown) of the mobile device 100 and transmitted by a ubiquitous proxy transmission interface (an RFID tag) of the dissemination medium 300. The RUIML ubiquitous proxy data comprises at least, but is not limited to, memory space with 96 bits, which comprises at least five fields. The fields comprise a linking identification (ID), a layout strategy section, a widget count section, a widget position section, and a widget section, as shown in FIG. 3.

The linking ID represents which RUIML ubiquitous proxy data belongs to the same ubiquitous proxy group and serially connects multiple sets of RUIML ubiquitous proxy data. Further, an address of the linking ID is, but is not limited to, 16 bits, so $2^8=256$ pieces of RUIML ubiquitous proxy data can be simultaneously stored without erroneous judgment.

The layout strategy section designates a layout strategy while a user interface is generated using a function component. Based on design principles, a layout strategy can only be applied for RUIML ubiquitous proxy services at the same ubiquitous proxy group. Thus, a section of a ubiquitous proxy group must be defined only for the first RUIML ubiquitous proxy service (the head of ubiquitous proxy services) of the ubiquitous proxy group and is filled with NULL for other RUIML ubiquitous proxy services of the ubiquitous proxy group.

The widget count section defines the amount of RUIML ubiquitous proxy services of a ubiquitous proxy group, the maximum is up to, but is not limited to, $2^6-1=63$.

The widget position section defines the relative sequence of RUIML ubiquitous proxy services of a ubiquitous proxy group, from 1 to 64. When the sequence of a RUIML ubiquitous proxy service of a ubiquitous proxy group is arranged as 1, the RUIML ubiquitous proxy service is the head of the RUIML ubiquitous proxy services of the ubiquitous proxy group, and defines layout strategies.

The widget section defines web service targets and visual representations of interactive components of contents of RUIML ubiquitous proxy data with which the RUIML ubiquitous proxy data points are associated. A single function component represents an icon of a control interface, such as a button, a pattern, and so on. In order to visually match the icons with the physical dissemination medium, the invention utilizes combinations of different shapes and multiple colors to achieve coherency of visual arrangement. Thus, the widget section provides, but is not limited to, a 4-bit shape field and a 4-bit color field, thus generating $2^4 \times 2^4 = 16 \times 16 = 256$ types of icons that satisfies designing requirements. The widget section further provides at least, but is not limited to, a URL address data field with 48 bits which stores URL addresses or compressed URL addresses.

When the RUIML ubiquitous proxy data residing in the same RUIML ubiquitous proxy group has been completely received and read, the RUIML process unit 110 records information within the widget position section of the RUIML ubiquitous proxy data, comprising shapes, colors, and a corresponding URL address, and transmits a planned layout strategy of the head of RUIML ubiquitous proxy services to the vision mapping and generating engine 130. The vision mapping and generating engine 130 generates corresponding icons according to the planned layout strategy of the head of RUIML ubiquitous proxy services and displays the generated icons on a human computer interaction interface of the mobile device 100 so users can further retrieve back-end web services based on the icons.

Vision Mapping and Generating Engine 130

The vision mapping and generating engine 130 receives the layout strategy and data of each function component transmitted from the RUIML process unit 100 to generate corresponding icons and displays the icons on the human computer interaction interface of the mobile device 100 for browsing and further interactions.

URL Address Transformation Module 150

When the user is interested in a function component on the human computer interaction interface and triggers an interactive event corresponding to the function component, the URL address transformation module 150 retrieves the URL address data of the function component or decompresses compressed URL address data with 64 bits as a correct URL address using a URL address codec module (not shown) and activates a web browsing tool to retrieve back-end application services.

When the user activates an interested item (triggering a corresponding activation component or selecting a corresponding totem, for example), the URL address transformation module 150 activates the web browsing tool and retrieves corresponding application services via the service broker server 200. Accordingly, when the user retrieves information provided by the RUIML ubiquitous proxy service using the mobile device 100, the service broker server 200 receives corresponding web application services (i.e. back-end web services).

Various types of application services are provided on the network and each of the application services must be processed using respective service processes and processing logics, which cannot be completely processed via a single web site. Thus, a decompiling server (i.e. the service broker server 200) must be used to lead the user to a corresponding portal site.

The service broker server 200 does not implement any application services but analyzes contents of URL addresses obtained by the user and then performs redirecting operations. Further, an application program interface (API) is provided for content service providers to design program codes of RUIML ubiquitous proxy services corresponding to the application services via the application program interface. Further, the service broker server 200 writes the program codes in a ubiquitous proxy transmission interface (such as an RFID tag) and installs the ubiquitous proxy transmission interface on dissemination media such as products, electronic media, posters, so that users can retrieve desirable services via the ubiquitous proxy services.

The following describes an embodiment of an implementation workflow of the ubiquitous proxy mobile service system.

Figure 4:
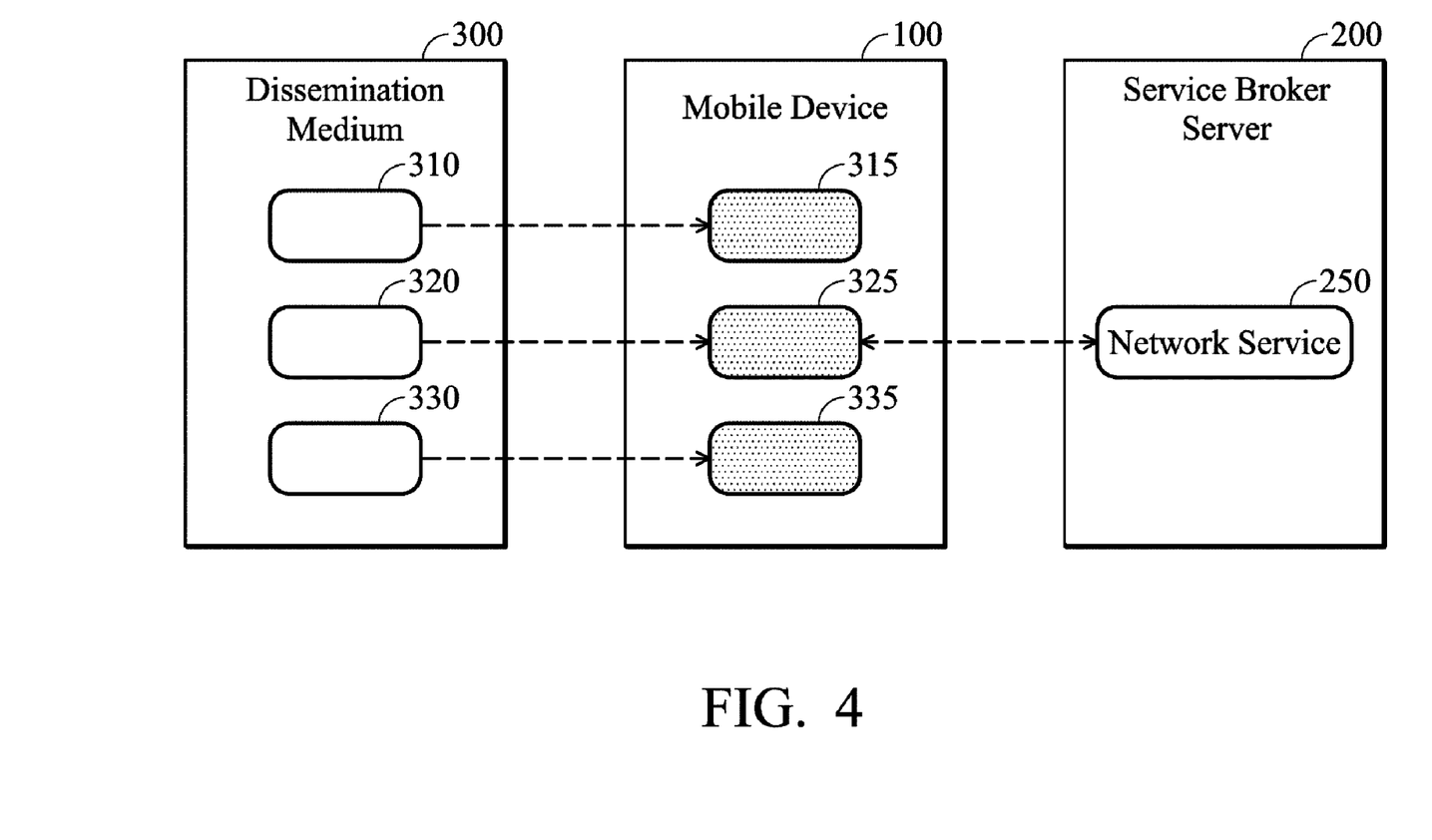
FIG. 4 is a workflow of implementation of the ubiquitous proxy mobile service system consistent with some embodiments.

Referring to FIGS. 2-4, the dissemination medium 300 comprises RUIML ubiquitous proxy transmission interfaces 310, 320, and 330. In this embodiment, each of the RUIML ubiquitous proxy transmission interfaces is an RFID tag. As the mobile device 100 is near the dissemination medium 300 and within detectable ranges of the RUIML ubiquitous proxy transmission interfaces 310, 320, and 330, the RUIML process unit 110 reads ubiquitous proxy data transmitted by the RUIML ubiquitous proxy transmission interfaces 310, 320, and 330 via a ubiquitous proxy receiving interface (an RFID receiver herein) of the mobile device 100.

The RUIML process unit 110 determines that the RUIML ubiquitous proxy transmission interfaces 310, 320, and 330 are defined in the same ubiquitous proxy group according to linking IDs of each ubiquitous proxy data, determines that three RUIML ubiquitous proxy services are included in the dissemination medium 300 according to widget count sections of each ubiquitous proxy data, determines that relative sequence of ubiquitous proxy services, corresponding to each of the RUIML ubiquitous proxy transmission interfaces 310, 320, and 330, in the ubiquitous proxy group represents 1, 2, and 3 according to the widget position section of each ubiquitous proxy data, determines layout of the ubiquitous proxy services, corresponding to the RUIML ubiquitous proxy transmission interfaces 310, 320, and 330, displayed on the screen of the mobile device 100 according to layout strategy sections of each ubiquitous proxy data, and determines shapes and colors of the ubiquitous proxy services, corresponding to the RUIML ubiquitous proxy transmission interfaces 310, 320, and 330, displayed on the screen of the mobile device 100 and corresponding URL address information according to widget sections of each ubiquitous proxy data.

The vision mapping and generating engine 130 displays interactive icons 315, 325, and 335 corresponding to the ubiquitous proxy data corresponding to the RUIML ubiquitous proxy transmission interfaces 310, 320, and 330 on the screen of the mobile device 100 according to the layout strategies of the layout strategy section of the head of the ubiquitous proxy data and the relative sequence of the widget position sections of each of the ubiquitous proxy data. For example, referring to FIG. 4, the layout strategy of the layout strategy section indicates the interactive icons 315, 325, and 335 are vertically arranged from the top to the bottom. Additionally, the vision mapping and generating engine 130 represents the shapes and colors of the interactive icons 315, 325, and 335 according to preset shapes and colors of the widget sections.

For example, when the user activates an interactive icon (selecting the interactive icon 325, for example), the URL address transformation module 150 reads the URL address data stored in the URL address data field of the widget section of the RUIML ubiquitous proxy data corresponding to the interactive icon 325, performs a redirecting operation to activate a web browsing tool of the mobile device 100, and connects the mobile device 100 to the service broker server 200 according to an obtained URL address or a decompressed URL address generated by decompressing a compressed URL address. Thus, the mobile device 100 can retrieve network service 250 via the service broker server 200.

Figure 5:
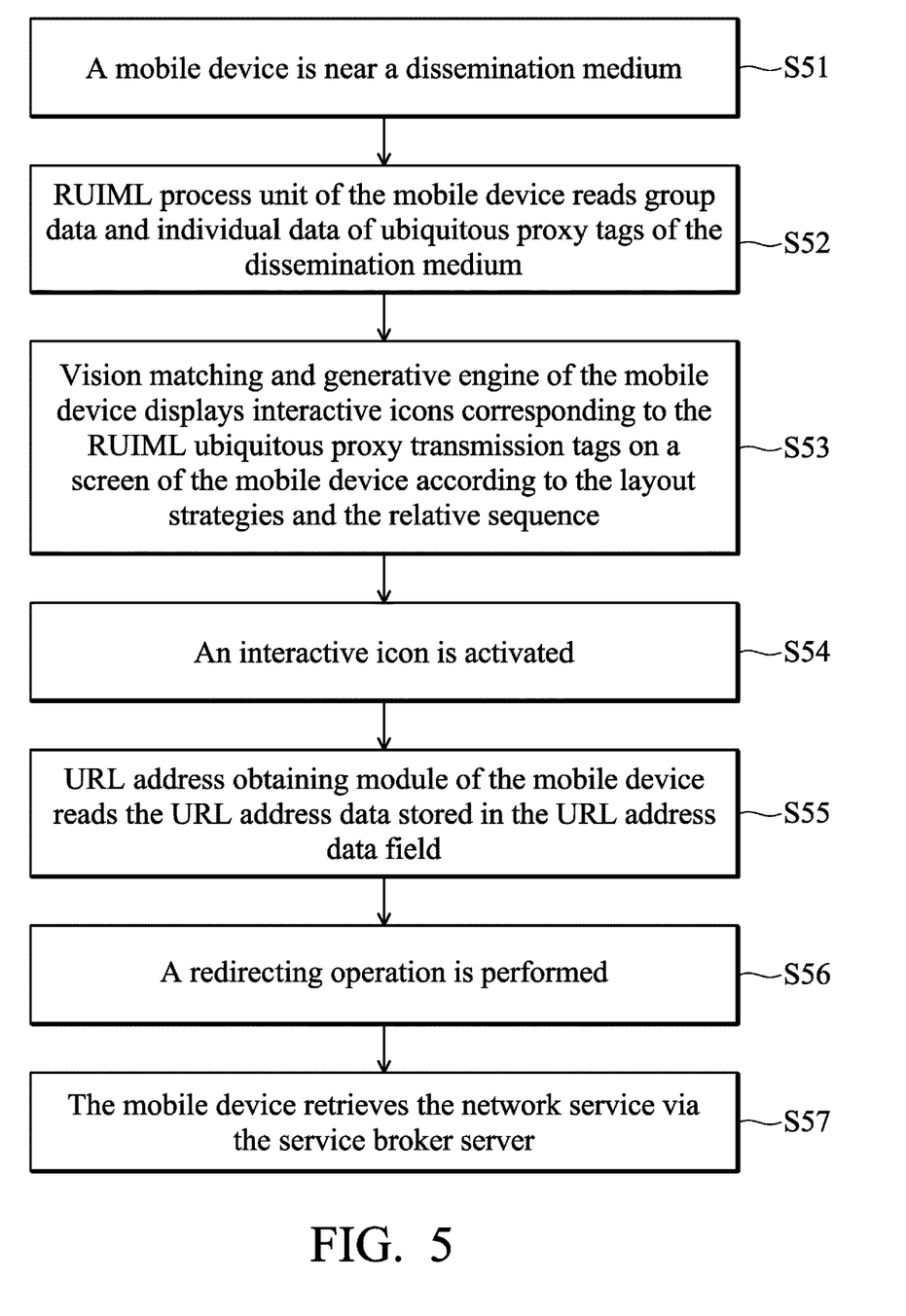
FIG. 5 is a flowchart of a ubiquitous proxy mobile service method consistent with some embodiments.

FIG. 5 is a flowchart of a ubiquitous proxy mobile service method consistent with some embodiments.

When a mobile device is near a dissemination medium (step S51), a RUIML process unit of the mobile device reads group data and individual data transmitted by transmission interfaces of first, second, and third ubiquitous proxy tags of the dissemination medium from a ubiquitous proxy receiving interface of the mobile device (step S52). The group data comprises a linking ID, a layout strategy section, a widget count section, and a widget position section. The individual data comprises a widget section.

The RUIML process unit determines that the first, second, and third RUIML ubiquitous proxy tags are defined in the same ubiquitous proxy group according to linking IDs of the data, determines that three RUIML ubiquitous proxy tags are included in the dissemination medium according to widget count sections of the data, determines that relative sequence of the first, second, and third ubiquitous proxy tags in the ubiquitous proxy group represents 1, 2, and 3 according to widget position section of the data, determines layout of the first, second, and third ubiquitous proxy tags displayed on the screen of the mobile device according to layout strategy sections of the data, and determines shapes and colors of the first, second, and third ubiquitous proxy tags displayed on the screen of the mobile device and corresponding URL address information according to widget sections of the data.

A vision mapping and generating engine of the mobile device displays first, second, and third interactive icons corresponding to the first, second, and third RUIML ubiquitous proxy transmission tags on a screen of the mobile device according to the layout strategies of the layout strategy section of the head of the ubiquitous proxy data and the relative sequence of the widget position sections of each data (step S53).

When the user activates an interactive icon (selecting the second interactive icon, for example) (step S54), a URL address transformation module of the mobile device reads the URL address data stored in the URL address data field of the widget section of the second RUIML ubiquitous proxy tag corresponding to the second interactive icon (step S55), performs a redirecting operation (step S56) to activate a web browsing tool of the mobile device, and connects the mobile device to a service broker server according to the redirecting operation. Thus, the mobile device can retrieve network service 250 via the service broker server 200 (step S57).

An embodiment of the ubiquitous proxy mobile service method and system can be applied for physical dissemination media comprising a product, a poster, a banner rotator, and so forth, in which transmission interfaces of ubiquitous proxy data complying with the RUIML format are internally embedded, such as Bluetooth, RFID tags, and so forth. The mobile device indicates miniature terminal designs capable of retrieving network services and detecting the ubiquitous proxy data via near communication, such as 3G cell phones and notebooks in which a ubiquitous proxy receiving interface (such as Bluetooth and an RFID reader) is internally embedded. The service broker server provides back-end network services mapping with the physical dissemination medium, such as shopping on the internet, making payments for downloading music, and so forth. Thus, the consumer pays for services when walking and viewing and selecting interested advertisements.

When ubiquitous proxy data stored in an RFID tag is detected, the mobile device decompiles the ubiquitous proxy data complying with the RUIML format. The decompiled RUIML ubiquitous proxy data comprises functional menus and combination instructions mapping with a dissemination medium and the mobile device generates a graphical operation interface corresponding to the dissemination medium according to the instructions. The graphical operation interface can be designed to be similar or equivalent to the ubiquitous proxy transmission interface for providing visual mapping impressions for the user who uses the mobile device, thereby achieving the goal of combining the mobile device and the physical medium. The consumer obtains corresponding network services by comparing the physical medium with the generated graphical interface of the mobile device via the screen of the mobile device.

The method and system transfers a reduced portion of a large dissemination medium to a mobile device using visual mapping. The user can directly view the large dissemination medium so most of the text, patterns, or multimedia of the dissemination medium is not transferred to the mobile device and only interactive parts, such as menus, service functions, on-line shopping, and extra information which require further network connections.

The method and system can be implemented by either RFID or Bluetooth, quick response (QR) codes or near field communication (NFC).

For example, when Bluetooth technology is used, a Bluetooth chip must be embedded in the mobile device and at least one tag complying with the Bluetooth communication protocol (such as Radio, Baseband, Link Manager, L2CAP, HCI, and so forth) must also be embedded in the dissemination medium. When the mobile device is near the dissemination medium, the Bluetooth chip detects the Bluetooth tag to retrieve tag information and obtains network services according to the tag information.

Further, when the QR codes are used, a camera or barcode reader and barcode decoding software must be installed in the mobile device and tags are printed on the dissemination medium by the QR code form. When the mobile device is near the dissemination medium, the camera or barcode reader reads the QR code tag to retrieve tag information and obtains network services according to the tag information.

Methods and systems of the present disclosure, or certain aspects or portions of embodiments thereof, may take the form of a program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A ubiquitous proxy mobile service method, comprising:
  when a mobile device is near a dissemination medium, reading group data and individual data of a ubiquitous proxy service transmitted by at least one ubiquitous proxy transmission interface of a dissemination medium from a ubiquitous proxy receiving interface of the mobile device, wherein the group data of the ubiquitous proxy service comprises a layout strategy section;

displaying an interaction icon corresponding to the ubiquitous proxy service on a screen of the mobile device according to the group data and the individual data;
reading uniform resource locator (URL) data in the individual data of the ubiquitous proxy service corresponding to the interaction icon when the interaction icon is activated;
performing a redirecting operation according to the uniform resource locator data; and
obtaining a corresponding network service according to the redirecting operation.

2. The ubiquitous proxy mobile service method as claimed in claim 1, wherein the group data of the ubiquitous proxy service comprises a linking ID.

3. The ubiquitous proxy mobile service method as claimed in claim 2, wherein a ubiquitous proxy group to which the ubiquitous proxy service belongs is determined according to the linking ID.

4. The ubiquitous proxy mobile service method as claimed in claim 1, wherein layout of the ubiquitous proxy service which is represented on the screen of the mobile device is determined according to a layout strategy provided by the layout strategy section.

5. The ubiquitous proxy mobile service method as claimed in claim 1, wherein the group data of the ubiquitous proxy service comprises a widget count section.

6. The ubiquitous proxy mobile service method as claimed in claim 5, wherein the amount of ubiquitous proxy services included in the dissemination medium is determined according to the widget count section.

7. The ubiquitous proxy mobile service method as claimed in claim 3, wherein the group data of the ubiquitous proxy service comprises a widget position section.

8. The ubiquitous proxy mobile service method as claimed in claim 7, wherein relative sequence of the ubiquitous proxy service in the ubiquitous proxy group relative to other ubiquitous proxy services is determined according to the widget position section.

9. The ubiquitous proxy mobile service method as claimed in claim 1, wherein the individual data of the ubiquitous proxy service comprises a widget section.

10. The ubiquitous proxy mobile service method as claimed in claim 9, wherein the shape and color of the ubiquitous proxy service represented on the screen of the mobile device and corresponding address information are determined according to the widget section.

11. The ubiquitous proxy mobile service method as claimed in claim 1, wherein the URL data represents a compressed URL address, wherein the redirecting operation comprises decompressing the compressed URL address.

12. The ubiquitous proxy mobile service method as claimed in claim 1, wherein the ubiquitous proxy service is a Rich User Interface Mark-up Language (RUIML) ubiquitous proxy service.

13. A ubiquitous proxy mobile service system, comprising:
a dissemination medium, comprising at least one ubiquitous proxy receiving interface; and
a mobile device, further comprising:
a screen;
at least one ubiquitous proxy transmission interface;
a process unit, reading group data and individual data of a ubiquitous proxy service transmitted by the ubiquitous proxy transmission interface through the ubiquitous proxy receiving interface when the mobile device is near the dissemination medium, wherein the group data of the ubiquitous proxy service comprises a layout strategy section;
a vision mapping and generating engine, displaying an interaction icon corresponding to the ubiquitous proxy service on a screen of the mobile device according to the group data and the individual data;
a URL address transformation module, reading URL data in the individual data of the ubiquitous proxy service corresponding to the interaction icon when the interaction icon is activated, performing a redirecting operation according to the uniform resource locator data, and obtaining a corresponding network service according to the redirecting operation.

14. The ubiquitous proxy mobile service system as claimed in claim 13, wherein the group data of the ubiquitous proxy service comprises a linking ID.

15. The ubiquitous proxy mobile service system as claimed in claim 14, wherein the process unit determines a ubiquitous proxy group to which the ubiquitous proxy service belongs according to the linking ID.

16. The ubiquitous proxy mobile service system as claimed in claim 13, wherein the process unit determines layout of the ubiquitous proxy service which is represented on the screen of the mobile device according to a layout strategy provided by the layout strategy section.

17. The ubiquitous proxy mobile service system as claimed in claim 13, wherein the group data of the ubiquitous proxy service comprises a widget count section.

18. The ubiquitous proxy mobile service system as claimed in claim 17, wherein the process unit determines the amount of ubiquitous proxy services included in the dissemination medium according to the widget count section.

19. The ubiquitous proxy mobile service system as claimed in claim 15, wherein the group data of the ubiquitous proxy service comprises a widget position section.

20. The ubiquitous proxy mobile service system as claimed in claim 19, wherein the process unit determines relative sequence of the ubiquitous proxy service in the ubiquitous proxy group relative to other ubiquitous proxy services according to the widget position section.

21. The ubiquitous proxy mobile service system as claimed in claim 13, wherein the individual data of the ubiquitous proxy service comprises a widget section.

22. The ubiquitous proxy mobile service system as claimed in claim 21, wherein the process unit determines the shape and color of the ubiquitous proxy service represented on the screen of the mobile device and corresponding address information according to the widget section.

23. The ubiquitous proxy mobile service system as claimed in claim 13, wherein the URL data represents a compressed URL address, and the URL address transformation module further comprises a URL address codec module for decompressing the compressed URL address.

24. The ubiquitous proxy mobile service system as claimed in claim 13, wherein the ubiquitous proxy service is a RUIML (Rich User Interface Markup Language) ubiquitous proxy service.

25. The ubiquitous proxy mobile service system as claimed in claim 13, wherein the dissemination medium further comprises:
an application program interface, writing program designing service content in the ubiquitous proxy transmission interface; and
a service broker sever,
wherein the ubiquitous proxy receiving interface of the dissemination medium reads the group data and the individual data included in the program and the redirecting operation comprises activating a web browsing tool and connecting to the service broker server to obtain the network service.

26. The ubiquitous proxy mobile service system as claimed in claim 25, wherein the ubiquitous proxy service is a RUIML (Rich User Interface Markup Language) ubiquitous proxy service.

27. A non-transitory computer-readable medium encoded with computer executable instructions for performing a ubiquitous proxy mobile service method, wherein the computer executable instructions comprise:

when a mobile device is near a dissemination medium, reading group data and individual data of a ubiquitous proxy service transmitted by at least one ubiquitous proxy transmission interface of a dissemination medium from a ubiquitous proxy receiving interface of the mobile device, wherein the group data of the ubiquitous proxy service comprises a layout strategy section;

displaying an interaction icon corresponding to the ubiquitous proxy service on a screen of the mobile device according to the group data and the individual data;

reading URL data in the individual data of the ubiquitous proxy service corresponding to the interaction icon when the interaction icon is activated;

performing a redirecting operation according to the uniform resource locator data; and obtaining a corresponding network service according to the redirecting operation.

28. The computer-readable medium as claimed in claim 27, wherein the URL data represents a compressed URL address, and the redirecting operation comprises decompressing the compressed URL address.

29. The computer-readable medium as claimed in claim 28, wherein the redirecting operation comprises activating a web browsing tool and connecting to a service broker server to obtain the network service.

* * * * *